US011525392B2

(12) United States Patent
Heller et al.

(10) Patent No.: US 11,525,392 B2
(45) Date of Patent: Dec. 13, 2022

(54) LONGITUDINALLY ADJUSTABLE CONNECTING ROD WITH MASS-OPTIMIZED CONTROL SLIDE

(71) Applicants: IWIS MOTORSYSTEME GMBH & CO. KG, Munich (DE); AVL LIST GMBH, Graz (AT)

(72) Inventors: Malte Heller, Munich (DE); Stefanie Bezner, Geltendorf (DE); Christian Gallob, Judenburg (AT); Martin Rath, Graz (AT); Bernhard Kometter, Judendorf (AT)

(73) Assignees: IWIS MOTORSYSTEME GMBH & CO. KG, Munich (DE); AVL LIST GMBH, Graz (AT)

( * ) Notice: Subject to any disclaimer, the term of this patent is extended or adjusted under 35 U.S.C. 154(b) by 0 days.

(21) Appl. No.: 17/283,236

(22) PCT Filed: Oct. 8, 2019

(86) PCT No.: PCT/AT2019/060337
§ 371 (c)(1),
(2) Date: Apr. 6, 2021

(87) PCT Pub. No.: WO2020/073070
PCT Pub. Date: Apr. 16, 2020

(65) Prior Publication Data
US 2021/0348552 A1 Nov. 11, 2021

(30) Foreign Application Priority Data

Oct. 8, 2018 (AT) .............................. A 50875/2018

(51) Int. Cl.
*F02B 75/04* (2006.01)
*F02D 15/02* (2006.01)
(Continued)

(52) U.S. Cl.
CPC ............ *F02B 75/045* (2013.01); *F02D 15/02* (2013.01); *F16C 7/06* (2013.01); *F16K 31/12* (2013.01); *F16K 31/524* (2013.01)

(58) Field of Classification Search
CPC .......... F02B 75/045; F02D 15/02; F16C 7/06; F16K 31/12; F16K 31/44; F16K 31/524; F16K 31/52416
See application file for complete search history.

(56) References Cited

U.S. PATENT DOCUMENTS 4,124,002 A  *  11/1978  Crise ..................... F02B 75/045
                                                    123/78 E
4,140,091 A  *   2/1979  Showers, Jr. ............ F16C 7/06
                                                    123/78 E
(Continued)

FOREIGN PATENT DOCUMENTS

AT              15006 U2    10/2016
CN           102937052 A     2/2013
(Continued)

*Primary Examiner* — Hung Q Nguyen
(74) *Attorney, Agent, or Firm* — BakerHostetler (57) ABSTRACT

A longitudinally adjustable connecting rod with a hydraulic control device for effecting a change in the effective length of the connecting rod is provided. The hydraulic control device comprises a hydraulic control valve which comprises a hydraulically actuatable control slide that is preloaded by way of a control slide spring, and two outlet valves which can be actuated by the control slide by way of two control contours arranged at a distance from one another. The control slide comprises a low-pressure section with a low-pressure piston for hydraulically actuating the control slide. For optimizing the control slide for such a longitudinally adjustable connecting rod, the two control contours are arranged together in a high-pressure section of the control slide which is arranged on one side of the low-pressure section and separated therefrom by way of a sealing section (Continued)

disposed therebetween. The control contours each comprise a closure region with control cams and an opening region adjoining the control cams. The closure region has a smaller cross-section than the opening region. The mass of the section of the control slide disposed between the two closure regions corresponds at most to 0.95 times the envelope volume of this section multiplied by the density of steel (7.85 g/mm$^3$) due to the selection of material and/or the contouring narrowing in comparison with the opening regions. A respective control slide and a reciprocating piston engine are also provided.

17 Claims, 4 Drawing Sheets

(51) Int. Cl.
  *F16C 7/06* (2006.01)
  *F16K 31/12* (2006.01)
  *F16K 31/524* (2006.01)

(56) References Cited

U.S. PATENT DOCUMENTS

| | | |
|---|---|---|
| 2002/0139946 A1 | 10/2002 | Stoecklein et al. |
| 2007/0034186 A1 | 2/2007 | Hefley |
| 2015/0122077 A1 * | 5/2015 | Melde-Tuczai ........... F16C 7/06 |
| | | 74/586 |
| 2017/0314462 A1 | 11/2017 | Miyazato |

FOREIGN PATENT DOCUMENTS

| | | | |
|---|---|---|---|
| CN | 105626258 A | 6/2016 | |
| CN | 105814327 A | 7/2016 | |
| CN | 108474408 A | 8/2018 | |
| DE | 102015011066 B3 * | 10/2015 | ............ F02B 75/045 |
| DE | 10 2015 121 915 A1 | 6/2017 | |
| DE | 10 2016 124 346 A1 | 6/2017 | |
| EP | 2 795 082 A1 | 10/2014 | |
| EP | 3 311 015 A1 | 4/2018 | |
| WO | 2013/092364 A1 | 6/2013 | |
| WO | 2016/203047 A1 | 12/2016 | |

* cited by examiner

LONGITUDINALLY ADJUSTABLE CONNECTING ROD WITH MASS-OPTIMIZED CONTROL SLIDE

CROSS-REFERENCE TO RELATED APPLICATIONS

This application is a National Stage of International patent application PCT/AT2019/060337, filed on Oct. 8, 2019, which claims priority to foreign Austrian patent application No. AT A50875/2018, filed on Oct. 8, 2018, the disclosures of which are incorporated by reference in their entirety.

FIELD OF THE INVENTION

The present invention relates to a longitudinally adjustable connecting rod with a hydraulic control device for effecting a change in the effective length of the connecting rod, where the hydraulic control device comprises a hydraulic control valve which comprises a hydraulically actuatable control slide that is preloaded by way of a control slide spring, and two outlet valves which can be actuated by the control slide by way of two control contours arranged at a distance from one another, where the control slide comprises a low-pressure section with a low-pressure piston for hydraulically actuating the control slide.

BACKGROUND

The thermal degree of efficiency η of spark ignition engines is dependent on the compression ratio ε, i.e. the ratio of the total volume prior to compression to the compression volume (ε=(displacement volume $V_h$+compression volume $V_c$)/compression volume $V_c$). As the compression ratio increases, the thermal efficiency increases. The increase in thermal efficiency over the compression ratio is degressive, but, in the range of values that are common today for the compression ratio (ε=10 . . . 14), it is still relatively pronounced.

In practice, the compression ratio cannot be increased arbitrarily. For example, too high a compression ratio in spark ignition engines leads to knocking. In this case, the mixture is ignited by the increase in pressure and temperature during compression and not by the ignition spark. This premature combustion not only leads to an uneven run, but can cause component damage.

The compression ratio, from which knocking occurs, depends, inter alia, on the operating point (n, T, throttle position, etc.) of the engine. Higher compression is possible in the partial load range. Therefore, it is endeavored to adjust the compression ratio to the respective operating point. There are different approaches to the development. In the present case, the compression ratio is to be adjusted by way of the connecting rod length. The connecting rod length influences the compression volume. The displacement is determined by the position of the crankshaft journal and the cylinder bore. A short connecting rod therefore leads to a smaller compression ratio than a long connecting rod with otherwise identical geometric dimensions (crankshaft, cylinder head, valve timing, etc.).

The connecting rod length is presently hydraulically varied between two positions. The mode of operation shall be explained briefly hereafter. The entire connecting rod is configured to be multi-part, where the change in length is effected by a telescopic mechanism. For this purpose, the connecting rod contains a double-action hydraulic cylinder. The connecting rod small end (piston pin) is connected to a piston rod. The piston is guided in an axially slidable manner in a cylinder which is arranged in the connecting rod member with the connecting rod large end (crankshaft journal). The piston separates the cylinder into two chambers (upper and lower pressure chamber). These two chambers are supplied with engine oil via check valves. If the connecting rod is disposed in the long position, there is no oil present in the upper pressure chamber. The lower pressure chamber, on the other hand, is completely filled with oil. During operation, the connecting rod is subjected to alternating pull and push forces due to the gas and mass forces. In the long position of the connecting rod, a pull force is absorbed by mechanical contact with an upper stop of the piston. As a result, the connecting rod length does not change. A push force applied is transmitted via the piston surface to the lower chamber filled with oil. Since the check valve of this chamber prevents oil from returning, the oil pressure increases. The connecting rod length does not change. The connecting rod is hydraulically locked in this direction.

The situation is reversed in the short position. The lower chamber is empty, the upper chamber is filled with oil. A pull force causes a pressure increase in the upper chamber. A push force is absorbed by a mechanical stop.

The connecting rod length can be adjusted in two steps in that one of the two chambers is emptied. One of the two respective inlet check valves is there bridged by an associated return flow duct. Oil can flow through this return flow duct independently of the pressure difference between the pressure chamber and the supply member. The respective check valve therefore loses its effect.

The two return flow ducts are opened and closed by a control valve, where precisely one return flow duct is always open, the other is closed. The actuator for switching the two return flow ducts is actuated hydraulically by the supply pressure. The oil supply is provided by the lubrication of the connecting rod bearing. For this purpose, an oil passage is required from the crankshaft journal via the connecting rod bearing to the connecting rod.

Switching the longitudinally connecting rod is effected by selectively emptying one of the two pressure chambers by making use of the mass and gas forces acting at the connecting rod, where the respective other pressure chamber is supplied with oil by an inlet check valve and is hydraulically blocked.

A longitudinally adjustable connecting rod for adjusting the compression ratio in the internal combustion engine is known, for example, from WO 2016/203047 A1. A control slide with a centrally arranged low-pressure piston is used there which is preloaded in one direction by a control slide spring. In certain variants, the ends of the control slide are provided with a conical control contour which act upon corresponding opening elements of the outlet valves arranged transverse to the control slide axis. This type of configuration requires relatively complicated oil supply paths and a distinct separation between the high-pressure regions of the control slide acting with the outlet valves and the low-pressure region with the low-pressure piston. The control tappet is structured to have two parts and the low-pressure piston must accommodate both stop positions. The actual tappet of the control slide is configured to be relatively massive and comprises the respective control contour only at the respective ends. Toward the outside, two high-pressure regions must be sealed off by way of respective closure elements.

A connecting rod is naturally exposed to very high acceleration forces. These acceleration forces must also be taken into account in the hydraulic control device for a length-adjustable connecting rod. It is therefore endeavored to construct parts of the hydraulic switching, presently the control slide, in such a way that a unit is created which is functional during operation of the internal combustion engine and which is structurally simple.

In addition to telescoping a connecting rod, which leads to an actual change in length, the change in the effective length can also be effected by using an eccentric, preferably at the connecting rod small end. Such an eccentric can likewise be actuated hydraulically. Due to the fact that the adjustability in length relates to the change in the distance between the connecting rod ends, an eccentric solution is also covered by the invention.

It is therefore the object of the present invention to improve a longitudinally adjustable connecting rod of the kind mentioned at the outset in such a way that a fully operational and structurally optimized control slide is created even for a small installation space available.

SUMMARY OF THE INVENTION

This object is satisfied according to the invention in that the two control contours are arranged together in a high-pressure section of the control slide, which is arranged on one side of the low-pressure section and separated therefrom by way of an sealing section disposed therebetween, that the control contours each comprise a closure region with control cams and an opening region adjoining the control cam, that the closure region has a smaller cross-section than the opening region, and that the mass of the section of the control slide disposed between the two closure regions corresponds at most to 0.95 times the envelope volume of this section multiplied by the density of steel (7.85 g/mm$^3$) due to the selection of material and/or the contourings narrowing in comparison with the opening regions.

The envelope contour of said section of the control slide presently means the smallest packaging size for this section, which has a uniform cross section over the entire length of the section. The largest cross-section of this section specifies the cross-sectional size of the envelope contour. For reducing the mass, either lighter materials can be used and/or material can be removed in this section. The inertial forces acting upon the control slide, which are substantially dependent on the rotational speed of the internal combustion engine and the concrete arrangement of the control slide in the connecting rod, can be further reduced with these measures. The one-sided arrangement of the high-pressure regions is also advantageous because one side of the high-pressure region is sealed by the control slide itself and only the low-pressure region on one side of the control slide at the connecting rod needs to be sealed. With this shaping, there is also the possibility of completely dispensing with a seal on the oppositely disposed side and to use a non-end-to-end bore, whereby the sealing of the high-pressure regions by way of closure elements in the connecting rod can be dispensed with, at least with regard to the bore receiving the control slide.

According to one variant, it is provided that the mass of the section of the control slide disposed between the two closure regions corresponds at most to 0.85 times the envelope volume of this section multiplied by the density of steel (7.85 g/mm$^3$) due to the selection of material and/or the contourings narrowing in comparison with the opening regions. It is therefore possible to reduce the mass even further in this section and nevertheless maintain operationality in this section. Good options for mass optimization are therefore given.

The axis of the control slide can advantageously be located in a plane which is arranged substantially perpendicular to a crankshaft axis that can be operatively connected to the connecting rod and is inclined relative to a longitudinal axis of the connecting rod. Due to the inclination within this plane, the influence of the acceleration can be optimized and adapted to the mass of the control slide. An inclination of approximately 45° is preferably selected. In addition, the arrangement of the control slide makes it possible to lead the valve axes of the outlet valves parallel to the crankshaft axis, for which reason the influence of acceleration on the outlet valves can also be greatly reduced. In this installation position, the largest longitudinal sections are additionally available for accommodating the control slide.

In principle, there is the possibility that the control cams either have flanks pointing towards one another or flanks pointing away from one another. Overall, this has an influence on the contouring of the control slide and also has influence on which outlet valve is the open valve in the basic position. This is preferably the outlet valve which is positioned closest to the low-pressure piston. Which arrangement of the outlet valves is selected must be decided taking into account the entire assembly of the connecting rod. At the moment, however, a variant is preferred in which the section of the control slide disposed between the two closure regions contains both opening regions. The control cams belonging to the closure regions therefore point away from one another and the outlet valve closer to the low-pressure piston is open in the basic position. In one embodiment, this is coupled to a pressure chamber which ensures the long switching position of the connecting rod, so that the longitudinally adjustable connecting rod always assumes the long switching position in the event of a pressure loss on the low-pressure side.

In order to ensure good stability with simultaneous hydraulic optimization despite the mass optimization of this section, a further variant provides that at least one support region is provided on the sides of the opening regions facing away from the closure regions and each of which is separated from the adjacent opening region by way of a drain groove. The opening region is therefore defined on one side by the control cam which anyway leads to a lower-lying closure region and is defined on the other side by a drain groove. As a result, there can be a good flow around the opening region when the outlet valve is open and obstruct the drainage of the hydraulic fluid as little as possible. The support region therebetween then provides the necessary support for the adjoining opening regions up on which a respective load is exerted in the open position.

Advantageously, each opening region can be associated with its own support region with a drain groove disposed therebetween, where the two support regions are separated from one another by way of a narrowing groove. The support regions are accordingly arranged relatively close to the opening regions; but separated from each other by a groove disposed therebetween, which again leads to savings in mass.

The distance from the center of the opening region to the center of the associated support region can preferably be in the range of 0.6 to 0.9 times the largest cross-sectional dimension of the opening region. The largest cross-sectional dimension of the opening region is preferably a diameter which then determines the respective distance and thereby leads to an optimized support as close as possible to the opening region. In this way, sufficient stability is obtained despite the contouring of the control slide in this section.

According to one variant, it is furthermore advantageous to have the support regions be arranged such that they are supported in any position of the control slide. This means that the support regions are guided in a section of the connecting rod and always remain in this guided section regardless of the control slide position. Depending on the control slide position, it may be that an opening region also retracts in this guided section and can possibly assist the support. The opening region therefore preferably has the same diameter as the support region.

The installation space for a control slide in a connecting rod is typically very limited, which is why only limited installation space can be made available for the hydraulic control device as well without seriously influencing the strength of the connecting rod. According to a further configuration, it is therefore provided that the opening stroke provided by the control contours is has a ratio of 0.1 to 0.4, preferably 0.2 to 0.3, to the control stroke of the control slide. The control stroke is the stroke caused by the low-pressure region, i.e. the longitudinal displacement of the control slide. The opening stroke is the stroke made available for actuating the outlet valves. Corresponding actuation mechanisms are presently created in a very small space, so that it is also possible to work with relatively small elements and the installation space to be taken up within the connecting rod is therefore as small as possible.

According to a variant, a further measure for reducing installation space is that the control stroke of the control slide has a ratio of 0.1 to 0.3, preferably 0.15 to 0.25, to the center-to-center distance of the two outlet valves. A small control stroke with a small distance between the outlet valves leads to the respective optimization of installation space.

According to a further configuration, a further structural measure for optimizing the mass of the control slide is to have the control slide be bored hollow in part from the end of the low-pressure section and have the bore extend into the sealing section. This saves weight in the low-pressure section and the sealing section.

The low-pressure section can preferably at its outer end comprise the low-pressure piston, at its other end a stop flange, and a narrowing groove can be provided between the low-pressure piston and the stop flange. The low-pressure region is therefore also mass-optimized and the low-pressure piston is disposed at the very end of the control slide. The structure of the control slide is accordingly such that it can be slid into a correspondingly shaped bore on one side without any additional receiving bushes etc. needing to be used. Only the low-pressure region needs to be closed by a closure screw which can at the same time provide the stop on one side for the piston.

According to a variant, it is furthermore advantageous if, at the outermost end of the high-pressure section, the closure region arranged there is configured as an extension such that a protection is created against a closing body of the outlet valve falling through. The closure region generally only needs to be shaped such that the outlet valve can close accordingly. For reasons of tolerance, the closure region should therefore not interact with the closed outlet valve any more. It has been found, however, that closing bodies acting upon the valve body are advantageous for the present application. They can be part of the valve body, or they can also represent separate bodies, e.g. a sphere. For their not getting lost when the outlet valve is closed, the closing bodies are prevented from falling through by an extension. In this position, however, the closing body no longer exerts any force induced by the control slide upon the valve body. The closing body is quasi captured by the extension in the valve opening of the outlet valve.

The invention further relates to a control slide for a longitudinally adjustable connecting rod according to one of the claims 1 to 13. The control slide is characterized by a low-pressure section with a low-pressure piston for the hydraulic actuation of the control slide, where two control contours are arranged together in a high-pressure section of the control slide which is arranged on one side of the low-pressure section and separated therefrom by way of a sealing section disposed therebetween, where the control contours each comprise a closure region with control cams and an opening region adjoining the control cam, where the closure region has a smaller cross-section than the opening region, and that the mass of the section of the control slide disposed between the two closure regions corresponds to at most to 9.5 times the envelope volume of this section multiplied by the density of steel (7.85 g/mm$^3$) due to the selection of material and/or the contourings narrowing in comparison with the opening regions.

The invention further relates to a piston engine with at least one engine cylinder, a reciprocating piston moving in the engine cylinder, and at least one adjustable compression ratio in the engine cylinder, as well as a longitudinally adjustable connecting rod connected to said reciprocating piston according to one of the claims 1 to 13.

BRIEF DESCRIPTION OF THE DRAWINGS

The invention shall be illustrated in more detail below with reference to the drawings, where.

DETAILED DESCRIPTION

Figure 1:
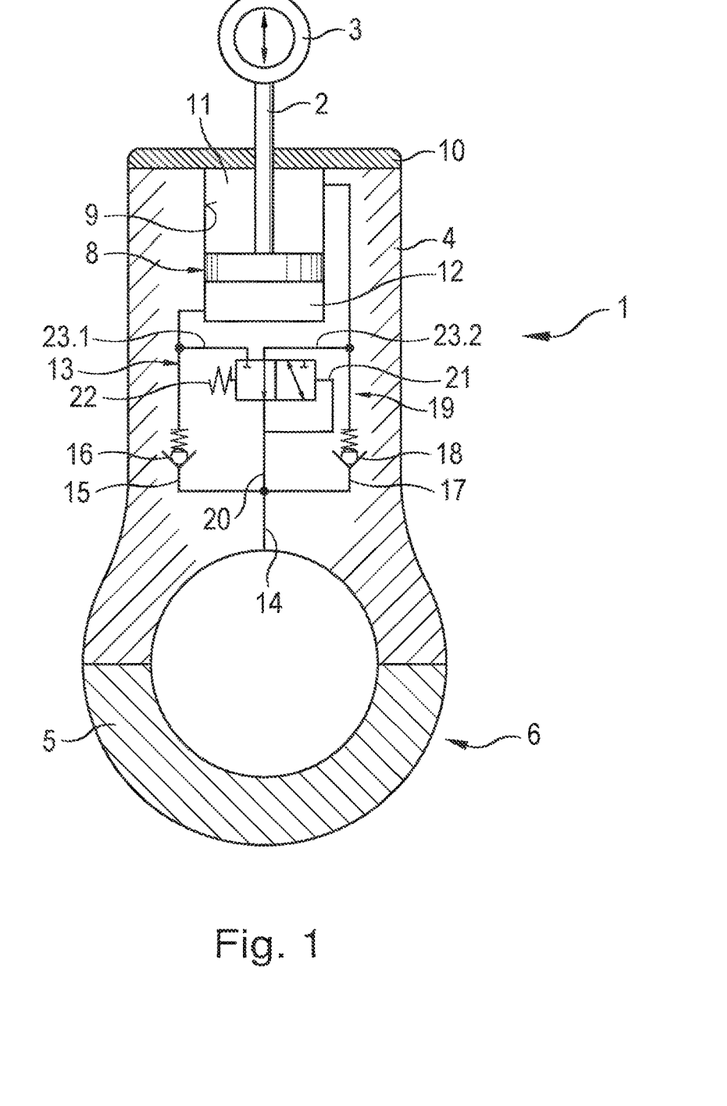
FIG. 1 shows the schematic functional representation of a longitudinally adjustable connecting rod.

FIG. 1 shows a longitudinally adjustable connecting rod (VCR connecting rod) schematically and by way of example. Connecting rod 1 comprises a movably arranged first rod member 2, at the upper end of which a connecting rod small end 3 is arranged. Second rod member 4 comprises a lower bearing shell 5 which, together with the lower region of second rod member 4, surrounds connecting rod large end 6. Lower bearing shell 5 and the upper region of second connecting rod member 4 are connected to one another in a typical manner by way of fastening devices (see FIG. 2). The lower end of first rod member 2 is provided with an adjustable piston 8 which is guided movable in a piston bore 9. Second connecting rod member 4 at the upper end comprises a cover 10 through which first rod member 2 passes and is sealed. Cover 10 therefore seals off cylinder bore 9 entirely. A first pressure chamber 11 having a circular cross-section is formed below adjustable piston 8 and a circular ring-shaped second pressure chamber 12 is formed above adjustable piston 8. In addition to the circular shape of adjustable piston 8 and pressure chambers 11, 12 formed therewith, other cross-sectional shapes, e.g. ellipses or polygons are also possible. Adjustable piston 8 and cylinder bore 9 are part of an adjustment mechanism for varying the connecting rod length. Part of the adjustment mechanism is also a hydraulic control device 13 which is later to be described in more detail and which respectively provides for a supply or drainage of the hydraulic medium or fluid, respectively, into or respectively out of pressure chambers 11 and 12 and thus for a motion of adjustable piston 8 or which locks adjustable piston 8. Hydraulic control device 13 in the embodiment illustrated is operated with engine oil. For this purpose, an oil supply duct 14 is in communication with connecting rod large end 6, through which engine oil can be supplied to hydraulic control device 13 or possibly flow out from the latter. Oil supply duct 14 branches into different sections (partial ducts). A first section 15 is in communication with first pressure chamber 11 to ensure an inflow into the first pressure chamber. Additionally disposed in first section 15 is a first check valve 16 which is intended to prevent the immediate outflow of the oil from first pressure chamber 11, but allows the inflow at any time. A second section 17 is in communication with second pressure chamber 12 to allow the inflow of oil into second pressure chamber 11. Disposed in second section 17 is a second check valve 18 which prevents the immediate outflow of oil from second pressure chamber 12, but allows the inflow at any time.

Furthermore, a control valve 19 having two switching positions is provided. Control valve 19 is in direct communication with a third section 20 of oil supply duct 14. Control valve 19 in one of its two switching positions acts as an outflow valve for the outflow of hydraulic fluid from second pressure chamber 12 or in its second switching position as an outflow valve for the outflow of hydraulic fluid from first pressure chamber 11. The respective other pressure chamber 11 and 12 is hydraulically blocked in the respective associated switching position, as a result of which first rod member 2 assumes either the retracted or the extended position. The motion of first rod member 2 takes place substantially in the direction of longitudinal axis L of connecting rod 1. Control valve 19 is switched by way of a control line 21 which is in communication with the oil supply of connecting rod 1, and a return spring 22 which presses control valve 19 to the first switching position shown in FIG. 1. The second switching position is assumed by creating an increased pressure level of the hydraulic medium—presently engine oil—in oil supply duct 14, so that control valve 13 is pressed to the second switching position against the force of return spring 22. Corresponding first and second return flow ducts 23.1 and 23.2 are in communication with control valve 19 in the associated section portions of first and second sections 15, 17 to enable a respective drainage from first pressure chamber 11 and second pressure chamber 12.

It is to be noted that hydraulic actuation circuit 13 can also comprise additional elements, ducts, valves, etc. or can be configured differently for providing the desired adjustment function. The hydraulic circuit diagram of hydraulic actuation circuit 13 is therefore only representative of the mode of operation and not of the concrete configuration. In a variant that is not shown, for example, third section 20 can be omitted or it can be configured as a drainage duct which drains the hydraulic medium into the surrounding of connecting rod 1.

Figure 2:
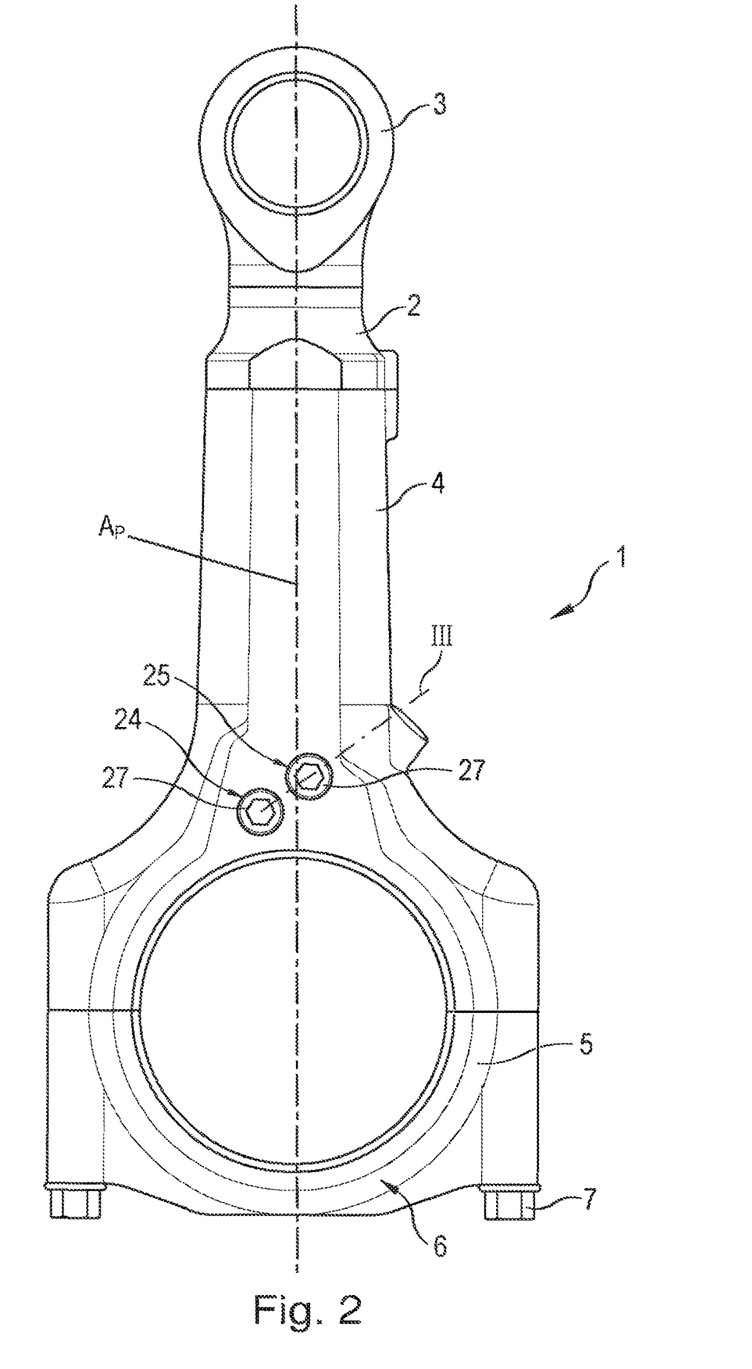
FIG. 2 shows a front view of an embodiment of a longitudinally adjustable connecting rod.
Figure 3:
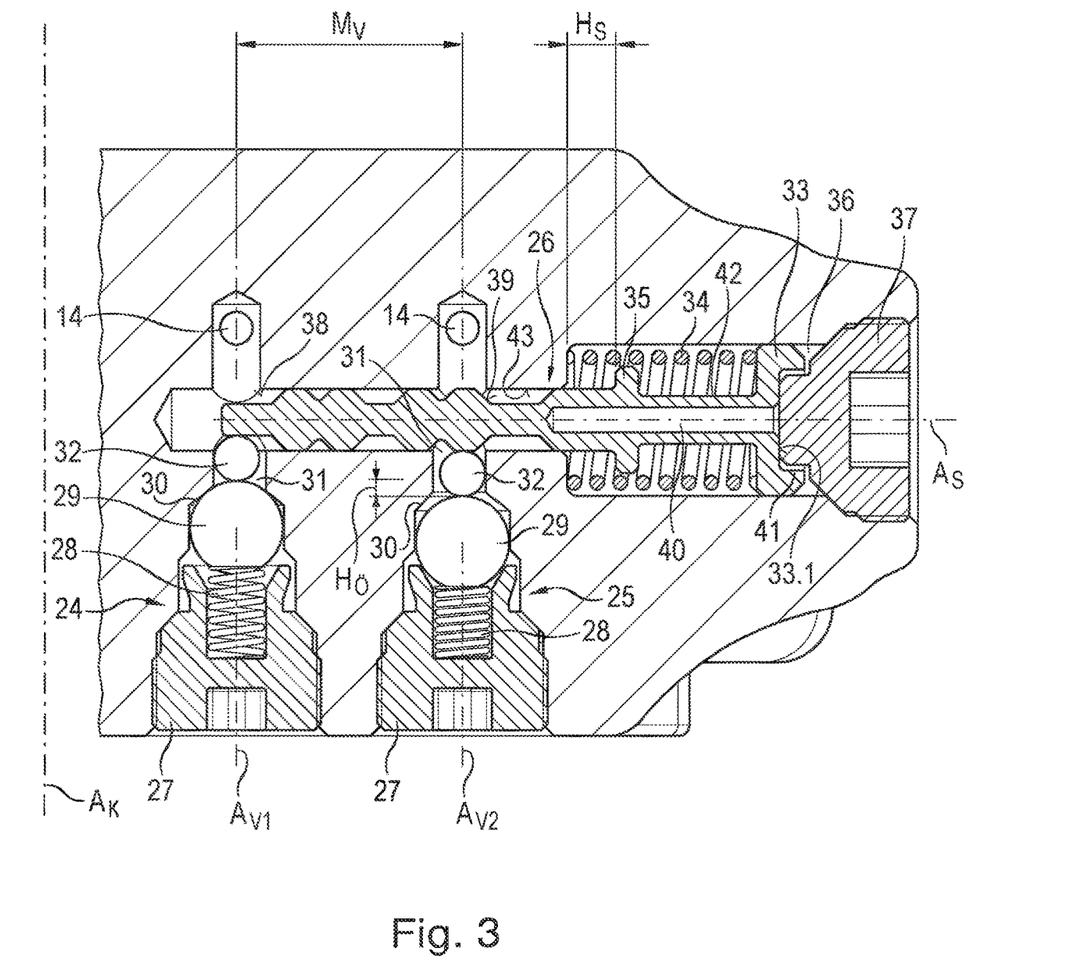
FIG. 3 shows an enlarged detail of the longitudinally adjustable connecting rod from FIG. 2, cut along the line III-III.

An embodiment of control valve 19 according to the invention shall be explained in more detail hereafter with reference to FIGS. 2 and 3.

FIG. 2 first shows a longitudinally adjustable connecting rod 1 with a first rod member 2 and a second rod member 4. The connecting rod length, i.e. substantially the distance between connecting rod small end 3 and connecting rod large end 6, is adjustable by the motion of rod members 2, 4 relative to one another along the longitudinal axis of the connecting rod $A_p$. Since only the essential differences to the preceding schematically illustrated connecting rod 1 shall be discussed hereafter, the above description is additionally made reference to using the same reference characters. Sectional line III reproduces the section plane as shown in FIG. 3. This mainly shows and describes the structure of control valve 19 in more detail. Control valve 19 comprises a first outlet valve 24 and a second outlet valve 25. Furthermore, a control slide 26 is part of control valve 19.

Both outlet valves 24 and 25 have the same structure, which is why the associated elements are described only with reference to first outlet valve 24. Outlet valve 24 comprises a closure screw 27 which is screwed into a corresponding threaded receiving opening in second rod member 4. A valve spring (helical compression spring) 28 acting upon spherical valve body 29 is arranged in closure screw 27. Spherical valve body 29 interacts with a conical valve seat 30 which opens into a valve opening 31. A likewise spherical closing body 32 is arranged in valve opening 31. First outlet valve 24 is shown in FIG. 3 in the closed position and second outlet valve 25 is shown in the open position. This corresponds to the switching position of control valve 19 in FIG. 1.

Outlet valves 24 and 25 are actuated by way of control slide 26. Control slide 26 can be actuated hydraulically and is in communication with the engine oil hydraulics. By increasing the pressure using the oil pump, pressure acts upon one side on a piston surface 33.1 of piston 33 of control slide 26. As a result, control piston 26 is moved to the left-hand side (FIG. 3) against the action of control piston spring 34. For this purpose, control slide 26 comprises a stop flange 35 which determines the second position. A closure screw 37 is provided for closing off pressure chamber 36 associated with piston 33. Control slide 26 comprises a first switching cam 38 and a second switching cam 39. Switching cams 38 and 39 each act upon associated closing body 32 which then moves valve body 29 as a result. In the position of control slide 26 shown in FIG. 3, there is so much play between control slide 26 and closing body 32 that valve body 29 is seated securely on valve seat 30 and is not impaired by closing body 32. Closing body 32 associated with second outlet valve 25 comprises a raised position in the position of control slide 26 shown in FIG. 3. Closing body 32 therefore acts upon valve body 29 and consequently compresses valve spring 28 and thereby presses valve body 29 away from valve seat 30. Second outlet valve 25 is thus opened. The oil can flow out of second pressure chamber 12 while first pressure chamber 11 is blocked.

If control slide 26 now moves to the left-hand side, then closing body 32 of second outlet valve 25 slides downwardly on control cam 39 to another position and releases valve body 29, so that valve spring 28 subsequently presses valve body 29 onto valve seat 30. Closing body 32 of first outlet valve 24 subsequently slides upwardly on control cam 38, whereby associated valve body 29 there as well is pushed away from the axis of control slide 26. At the same time, associated valve spring 28 compresses and lifts valve body 29 off valve seat 30. As a result, the second valve position of control valve 19 is then assumed. This results in the short position of longitudinally adjustable connecting rod 1.

Figure 4:
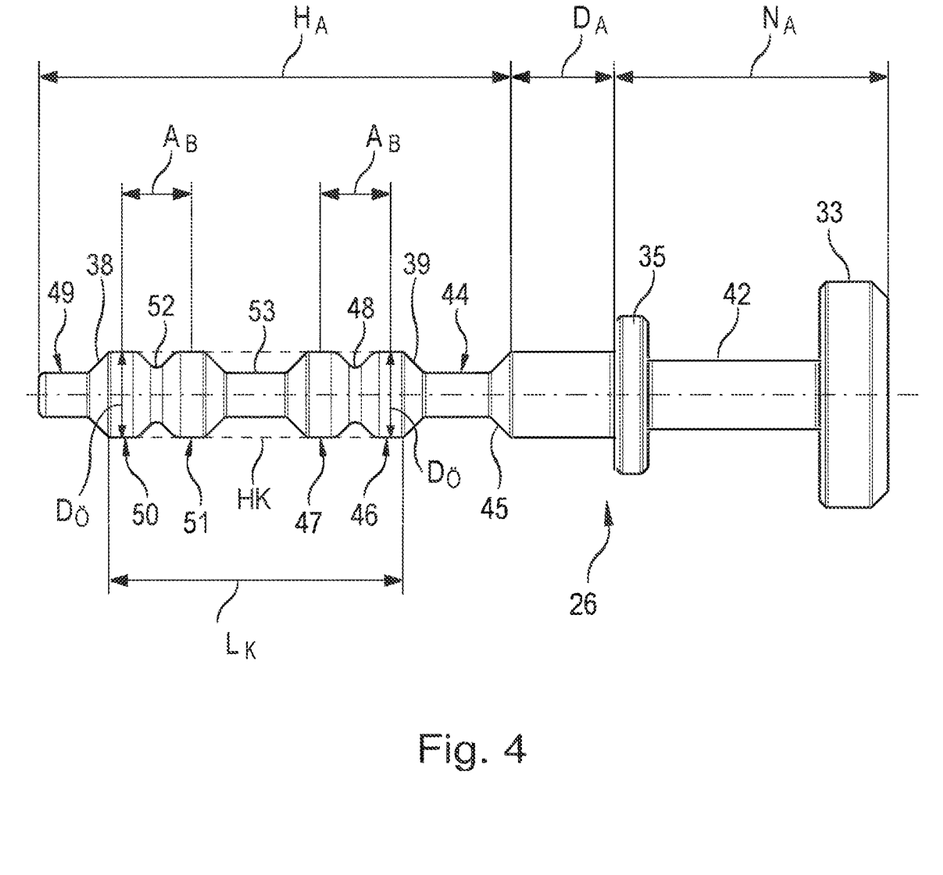
FIG. 4 shows an enlarged illustration of the control slide from FIG. 3.

The configuration control slide 26 shall be described in more detail hereafter with reference to FIGS. 3 and 4.

Control slide 26 is divided into a low-pressure section $N_A$, a high-pressure section $H_A$, and a sealing section $D_A$ disposed therebetween. High-pressure section $H_A$ is associated with the actuation of outlet valves 24, 25 and low-pressure section $N_A$ is associated with the actuation of control slide 26. Sealing section $D_A$ separates the two other sections $H_A$ and $N_A$ from one another and seals them against one another. Low-pressure section $N_A$ is drilled hollow by way of a bore 40 which, however, also extends into sealing section $D_A$. Provided in the region of piston area 33.1 is a depression 41 which provides a stop surface for striking against closure screw 37 in the position shown in FIG. 3. In this position, control slide 26 is pressed against this stop by way of control slide spring 34 and may also not lift off from the stop due to inertial forces when connecting rod 1 moves, provided that the switching position shown in FIG. 3 is to be maintained. The fact that the space receiving control slide spring 34 comprises a drainage opening for discharging hydraulic oil is not shown in greater detail. An annular groove 42 is provided between stop flange 35 and low-pressure piston 33 which is larger in diameter. The diameter in the region of annular groove 42 is smaller than the diameter in the region of sealing section $D_A$. Overall, this results in a lightweight low-pressure section $N_A$ and, due to bore 40, also a lightweight sealing section $D_A$.

Sealing section $D_A$ is led in a bore 43 in a sealing manner. Bore 43 and the diameter of sealing section $D_A$ are consequently also crucial for the configuration of high-pressure section $H_A$. The longitudinal section involved in the sealing independently of the switching positions of control slide 26 is part of sealing section $D_A$.

High-pressure section $H_A$ first comprises a first closure region 44 adjoining sealing section $D_A$. The transition between sealing section $D_A$ and first closure region 44 is effected by way of a cone 45 that is part first closure region 44. Control cam 39, which is likewise configured as a cone, is also part of first closure region 44. The small diameter of first closure region 44 is adapted to the opening stroke of outlet valves 24, 25. First opening region 46 adjoins first closure region 44. The diameter $D_O$ of first opening region 46 is identical to the diameter of sealing section $D_A$. The difference between diameter $D_O$ of first opening region 46 and the small diameter of first closure region 44 is slightly larger than the available opening stroke $H_O$ for associated outlet valve 25. A first support region 47 is arranged adjacent to first opening region 46. The diameter of first support region 47 is identical to the diameter of first opening region 46. First opening region 46 and first support region 47 are separated from one another by a V-shaped drain groove 48. As is evident from FIG. 3, drain groove 48 supports the drainage of the hydraulic oil in the open position of outlet valve 25.

Second closure region 49 is disposed at the other end of high-pressure section $H_A$. Second closure region 49 could actually also be created only by control cam 38 which is likewise formed to be conical. As can be seen in FIG. 3, the cylindrical section of second closure region 49 configured as an extension serves as a protection against closing body 32 of outlet valve 24 falling through. Second opening region 50 adjoins second closure region 49. The diameter of second opening region 50 again corresponds to the diameter of first opening region 46. The diameter difference between second opening region 50 and the cylindrical section of second closure region 49 is again somewhat larger than opening stroke $H_O$ of outlet valve 24. Arranged adjacent to the second opening region is a second support region 41, the diameter of which again corresponds to diameter $D_O$ of second opening region 50. Second opening region 50 and second support region 51 are separated from one another by a V-shaped drain groove 52. The latter as well supports the drainage of hydraulic oil when outlet valve 24 is opened. A narrowing groove 53 is arranged between two support regions 47 and 51. The basic diameter of groove 53 corresponds approximately to the small diameter of closure regions 44 and 49. The transition of groove 53 to adjoining support regions 47 and 51 is effected by way of a cone.

The center-to-center distance $M_V$ of two outlet valves 24, 25 is at a certain ratio to control stroke $H_S$ of control slide 26. In the present example, the magnitude of control stroke $H_S$ is 0.2 times the center-to-center distance $M_V$ (and is therefore in the range from 0.1 to 0.3 times $M_V$. Distance $A_B$ between the center of first opening region 46 and the center of first support region 47 as well as the center of second opening region 50 and the center of second support region 41 are at a certain ratio to the largest cross-sectional dimension of respective opening region 46, 50 and in the present case that means diameter $D_O$. In the present case, distance $A_B$ is 0.75 times diameter $D_O$ (and is therefore in the range of 0.6 to 0.9 times the diameter $D_O$).

Opening stroke $H_O$ provided by the control contour is also at a certain ratio to control stroke $H_S$ of control slide 26. In the present case, opening stroke $H_O$ is 0.25 times control stroke $H_S$ (and is therefore in the range of 0.1 to 0.4 times control stroke $H_S$).

Control slide 26 is subjected to the highest load in high-pressure section $H_A$, which is why it must be sufficiently strong. At the same time, this region controls two outlet valves 24 and 25 in opposite directions in the two switching positions of control slide 26. For these reasons, mass optimization is sought in the region of high-pressure section $H_A$. The focus there is on the section between the two closure sections 44 and 49. This is therefore the section formed by first opening region 46, drain groove 48, first support region 47, annular groove 53, second support region 51, drain groove 52, and second opening region 50. In the present example, this section has an envelope contour $H_K$ having a length $L_K$ and a diameter which corresponds to diameter $D_O$. The volume of this envelope contour $H_K$ is accordingly a cylinder and serves as a comparison volume. The volume of envelope contour $H_K$ is multiplied by the mass of steel. For the invention, this mass of steel corresponds to the value of 7.85 g/mm$^3$. From this, a comparison mass is calculated for said section of length $L_K$. Since first and second opening regions 46 and 50 as well as first and second support regions 47 and 51 have the same diameter $D_O$, the volume reduction is effected mainly through drain grooves 48 and 52 as well as groove 53 A reduction in mass can be achieved by use of a material in the region of this section (or for high-pressure section $H_A$ or entire control slide 26) that has a lower density than steel, for example, titanium. In the present case, however, control slide 26 is made entirely of steel material which is accordingly heat-treated in a suitable manner. The reduction in mass is therefore effected exclusively through the configuration of said grooves 48, 52 and 53. In the present case, the mass of the section having the length $L_K$ is 0.8 times the associated mass of the envelope volume of this section multiplied by the density of steel (and is therefore below 0.85 times the calculated mass of the envelope volume). As a result of this selectively performed weight reduction, the mass of control slide 26 cannot only be significantly reduced, but can also be adjusted for a wide variety of applications based on the measures presently taken by introducing grooves 48, 52 and 52. The acceleration forces that act upon control slide 26 are not to be underestimated, for which reason considerable forces can act upon control slide spring 34 due to the total mass of control slide 26. The opening pressure acting in low-pressure section $N_A$ must also be selected such that a displacement of control slide 26 is ensured despite this influence of the mass. In one embodiment, it is therefore attempted to keep the mass of control slide 26 below 1 g.

List of Reference Characters

1 connecting rod
2 first rod member
3 connecting rod small end
4 second rod member
5 lower bearing shell
6 connecting rod large end
7 fastening device
8 adjustable piston
9 piston bore
10 cover
11 first pressure chamber
12 second pressure chamber
13 hydraulic control device
14 oil supply duct
15 first section
16 first check valve
17 second section
18 second check valve
19 control valve
20 third section
21 control line
22 return spring
23.1 first return flow duct
23.2 second return flow duct
24 first outlet valve
25 second outlet valve
26 control slide
27 closure screw
28 valve spring
29 valve body
30 valve seat
31 valve opening
32 closing body
33 low pressure piston
33.1 piston area
34 control slide spring
35 stop flange
36 pressure chamber
37 closure screw
38 control cam
39 control cam
40 bore
41 depression
42 annular groove
43 bore
44 first closure region
45 cone
46 first opening region
47 first support region
48 V-shaped drain groove
49 second closure region
50 second opening region
51 second support region
52 V-shaped drain groove
53 groove
$A_B$ center-to-center distance of the opening region and the support region
$A_K$ axis of the crankshaft
$A_P$ longitudinal axis of the connecting rod
$A_S$ axis of the control slide
$A_{V1}$ closing axis of the first outlet valve
$A_{V2}$ closing axis of the second outlet valve
$D_A$ sealing section
$H_A$ high-pressure section
$H_K$ envelope contour
$H_O$ opening stroke of the outlet valves
$H_S$ control stroke of the control slide
$L_K$ length of the envelope contour
$M_V$ center-to-center distance of the outlet valves
$N_A$ low-pressure section

The invention claimed is:

1. A longitudinally adjustable connecting rod with a hydraulic control device for effecting a change in an effective length of said connecting rod, wherein said hydraulic control device comprises a hydraulic control valve which comprises a hydraulically actuatable control slide that is preloaded by way of a control slide spring and two outlet valves which can be actuated by said control slide by way of two control contours arranged at a distance from one another, wherein said control slide comprises a low-pressure section ($N_A$) with a low-pressure piston for hydraulically actuating said control slide, wherein said two control contours are arranged together in a high-pressure section ($H_A$) of said control slide which is arranged on one side of said low-pressure section ($N_A$) and separated therefrom by way of a sealing section ($D_A$) disposed therebetween, that said control contours each comprise a closure region with control cams and an opening region adjoining said control cam, that said closure region has a smaller cross-section than said opening region, and that the mass of a portion of said control slide disposed between said two closure regions corresponds at most to 0.93 times the envelope volume of this portion multiplied by the density of steel (7.85 g/mm$^3$) due to the selection of material and/or the contourings narrowing in comparison with said opening regions.

2. The longitudinally adjustable connecting rod according to claim 1, wherein the mass of the portion of said control slide disposed between said two closure regions corresponds at most to 0.85 times the envelope volume of this portion multiplied by the density of steel (7.85 g/mm$^3$) due to the selection of material and/or the contourings narrowing in comparison with said opening regions.

3. The longitudinally adjustable connecting rod according to claim 1, wherein an axis ($A_S$) of said control slide is located in a plane which is substantially perpendicular to a crankshaft axis ($A_K$) operatively connected to said connecting rod and inclined relative to a longitudinal axis ($A_P$) of said connecting rod.

4. The longitudinally adjustable connecting rod according to claim 1, wherein the section of said control slide disposed between said two closure regions contains both of said opening regions.

5. The longitudinally adjustable connecting rod according to claim 1, wherein at least one support region is provided on the sides of said opening regions facing away from said closure regions and each of which is separated from the adjacent opening regions by way of a drain groove.

6. The longitudinally adjustable connecting rod according to claim 5, wherein each of said opening regions is associated with its own support region and said two support regions are separated from one another by way of a narrowing groove.

7. The longitudinally adjustable connecting rod according to claim 6, wherein a distance ($A_B$) from a center of said opening region to a center of said associated support region is in the range of 0.6 to 0.9 times the largest cross-sectional dimension of said opening region.

8. The longitudinally adjustable connecting rod according to claim 6, wherein said support regions are arranged such that they are supported in any position of said control slide.

9. The longitudinally adjustable connecting rod according to claim 1, wherein an opening stroke ($H_O$) provided by said control contours is at a ratio of 0.1 to 0.4 to a control stroke ($H_S$) of said control slide.

10. The longitudinally adjustable connecting rod according to claim 1, wherein a control stroke ($H_S$) of said control slide is at a ratio of 0.1 to 0.3 to a center-to-center distance ($M_V$) of said two outlet valves.

11. The longitudinally adjustable connecting rod according to claim 1, wherein said control slide is bored hollow in part from the end of said low-pressure section ($N_A$) and said bore extends into said sealing section ($D_A$).

12. The longitudinally adjustable connecting rod according to claim 1, wherein said low-pressure section ($N_A$) at its outer end comprises said low-pressure piston, at its other end a stop flange, and a narrowing annular groove between said low-pressure piston and said stop flange.

13. The longitudinally adjustable connecting rod according to claim 1, wherein at the outermost end of said high-pressure section ($H_A$), said closure region arranged there is configured as an extension such that a protection is created against a closing body of said outlet valve falling through.

14. A control slide for a longitudinally adjustable connecting rod according to claim 1, wherein a low-pressure section ($N_A$) with a low-pressure piston for hydraulically actuating said control slide, where two control contours are arranged at a distance from one another together in a high-pressure section ($H_A$) of said control slide which is arranged on one side of said low-pressure section ($N_A$) and separated therefrom by way of a sealing section ($D_A$) disposed therebetween, where said control contours each comprise a closure region with control cams and an opening region adjoining said control cam, where said closure region has a smaller cross-section than said opening region and where the mass of the portion of said control slide disposed between said two closure regions corresponds at most to 0.95 times the envelope volume ($H_K$) of this portion multiplied by the density of steel (7.85 g/mm$^3$) due to the selection of material and/or the contourings narrowing in comparison with said opening regions.

15. A piston engine with at least one engine cylinder, a reciprocating piston moving in said engine cylinder, and at least one adjustable compression ratio in said engine cylinder, and as a longitudinally adjustable connecting rod connected to said reciprocating piston according to claim 1.

16. The longitudinally adjustable connecting rod according to claim 9, wherein said opening stroke ($H_O$) provided by said control contours is at a ratio of 0.2 to 0.3 to the control stroke ($H_S$) of said control slide.

17. The longitudinally adjustable connecting rod according to claim 10, wherein said control stroke ($H_S$) of said control slide is at a ratio of 0.15 to 0.25 to the center-to-center distance ($M_V$) of said two outlet valves.

* * * * *